(12) United States Patent
Miyoshi

(10) Patent No.: US 8,208,488 B2
(45) Date of Patent: *Jun. 26, 2012

(54) RADIO TRANSMISSION APPARATUS AND RADIO TRANSMISSION METHOD

(75) Inventor: Kenichi Miyoshi, Yokohama (JP)

(73) Assignee: Panasonic Corporation, Osaka (JP)

( * ) Notice: Subject to any disclaimer, the term of this patent is extended or adjusted under 35 U.S.C. 154(b) by 138 days.

This patent is subject to a terminal disclaimer.

(21) Appl. No.: 12/490,231

(22) Filed: Jun. 23, 2009

(65) Prior Publication Data

US 2009/0258609 A1 Oct. 15, 2009

Related U.S. Application Data

(63) Continuation of application No. 10/498,052, filed as application No. PCT/JP2003/010200 on Aug. 11, 2003, now Pat. No. 7,567,583.

(30) Foreign Application Priority Data

Sep. 13, 2002 (JP) .................................. 2002-268968

(51) Int. Cl.
*H04J 3/16* (2006.01)
(52) U.S. Cl. ........ 370/465; 370/339; 370/334; 370/328; 370/476
(58) Field of Classification Search .................. 370/339, 370/334, 476, 465
See application file for complete search history.

(56) References Cited

U.S. PATENT DOCUMENTS

| | | | | |
|---|---|---|---|---|
| 4,639,914 A * | 1/1987 | Winters | ......................... | 370/334 |
| 5,936,577 A | 8/1999 | Shoki | | |
| 5,982,327 A | 11/1999 | Vook | | |
| 6,107,963 A | 8/2000 | Ohmi | | |
| 6,141,542 A | 10/2000 | Kotzin | | |
| 6,292,135 B1 | 9/2001 | Takatori | | |
| 6,351,499 B1 * | 2/2002 | Paulraj et al. | .................. | 375/267 |
| 6,611,675 B1 * | 8/2003 | Salonen et al. | ................. | 455/69 |
| 6,628,733 B1 | 9/2003 | Tomiyoshi et al. | | |
| 6,636,493 B1 * | 10/2003 | Doi et al. | ...................... | 370/332 |

(Continued)

FOREIGN PATENT DOCUMENTS

EP 1 148 659 10/2001

(Continued)

OTHER PUBLICATIONS

International Search Report dated Nov. 18 2003.

(Continued)

*Primary Examiner* — Ricky Ngo
*Assistant Examiner* — Dewanda Samuel

(74) *Attorney, Agent, or Firm* — Seed IP Law Group PLLC

(57) ABSTRACT

Data streams stored in buffers are modulated by modulation sections. Multipliers multiply the signals output from the modulation sections by weights output from a weight control section. The signals output from the multipliers are added up by addition sections, subjected to radio transmission processing by transmission radio sections and sent through antennas. A buffer control section controls the buffers based on a retransmission count output from a retransmission count detection section. The weight control section outputs weights different from weights at the time of previous transmission to the multipliers every time data is retransmitted. This allows a diversity gain at the time of data retransmission to be increased even if a time variation of the propagation path environment for radio signals is slow.

7 Claims, 13 Drawing Sheets

U.S. PATENT DOCUMENTS

| | | | |
|---|---|---|---|
| 6,678,309 B1* | 1/2004 | Kitahara | 375/144 |
| 6,687,492 B1* | 2/2004 | Sugar et al. | 455/276.1 |
| 6,728,918 B1 | 4/2004 | Ikeda | |
| 6,735,182 B1* | 5/2004 | Nishimori et al. | 370/294 |
| 6,754,473 B1 | 6/2004 | Choi et al. | |
| 6,763,062 B1 | 7/2004 | Kohno | |
| 6,771,219 B2* | 8/2004 | Sim | 342/382 |
| 6,771,988 B2 | 8/2004 | Matsuoka | |
| 6,888,809 B1* | 5/2005 | Foschini et al. | 370/334 |
| 7,012,978 B2* | 3/2006 | Talwar | 375/346 |
| 7,058,418 B2 | 6/2006 | Doi | |
| 7,065,131 B2 | 6/2006 | Dergel | |
| 7,184,795 B2* | 2/2007 | Mizuguchi | 455/562.1 |
| 7,236,538 B1* | 6/2007 | Banister | 375/267 |
| 7,266,346 B2 | 9/2007 | Hoshino | |
| 7,308,037 B2 | 12/2007 | Akita | |
| 7,403,798 B2 | 7/2008 | Doi | |
| 7,406,337 B2 | 7/2008 | Kim | |
| 7,415,249 B2 | 8/2008 | Lobinger | |
| 7,561,850 B2* | 7/2009 | Hara | 455/69 |
| 7,633,906 B2* | 12/2009 | Jin et al. | 370/334 |
| 2001/0033547 A1 | 10/2001 | Izumi | |
| 2001/0053143 A1 | 12/2001 | Li et al. | |
| 2002/0028694 A1 | 3/2002 | Doi | |
| 2002/0089965 A1 | 7/2002 | Kim | |
| 2002/0106989 A1 | 8/2002 | Aizawa et al. | |
| 2002/0168946 A1 | 11/2002 | Aizawa et al. | |
| 2002/0187753 A1* | 12/2002 | Kim et al. | 455/69 |
| 2003/0072285 A1 | 4/2003 | Onggosanusi et al. | |
| 2004/0252779 A1 | 12/2004 | Rouquette | |

FOREIGN PATENT DOCUMENTS

| | | |
|---|---|---|
| EP | 1 206 051 | 5/2002 |
| EP | 1294120 | 3/2003 |
| JP | 621924 | 1/1994 |
| JP | 10075196 | 3/1998 |
| JP | 11027187 | 1/1999 |
| JP | 2000151486 | 5/2000 |
| JP | 2000244377 | 9/2000 |
| JP | 2001257660 | 9/2001 |
| JP | 2001333051 | 11/2001 |
| JP | 2001358626 | 12/2001 |
| JP | 2002026790 | 1/2002 |
| JP | 2002044051 | 2/2002 |
| JP | 2002084219 | 3/2002 |
| JP | 2003134094 | 5/2003 |
| WO | 0118908 A1 | 3/2001 |

OTHER PUBLICATIONS

Japanese Office Action with English Translation of Japanese Patent Application No. 2005-111862 dated Jul. 13, 2007.

Y. Hara, et al. "Weight Control Scheme for MIMO System with Multiple Transit and Receiver Beamforming" vol. 102, No. 282, The Institute of Electronics, Information and Communication Engineers (IEICE), Aug. 23, 2002, pp. 33-40, with English Abstract.

Y. Takatori, et al. "Downlink Beamforming Method for SDMA Smart Antennas in Multipath Fading Environments" vol. 101 No. 683, The Institute of Electronics, Information and Communication Engineer (IEICE), Technical Report, Feb. 28, 2002, pp. 145-150, with English Abstract.

3GPP TR 25.876 V1.1.0 (Apr. 2002) "3rd Generation Partnership Project; Technical Specification Group Radio Access Network; Multiple-Input Multiple Output Antenna Processing for HSDPA," pp. 3-10.

International Search Resort dated Nov. 18 2003.

K. Miyashita, et al.; "Eigenbeam—Space Division Multiplexing (E-SDM) in a MIMO Channel," IEICE RCS2002-53 (May 2002), pp. 13-18.

Supplementary European Search Report dated Jul. 21, 2005.

* cited by examiner

|  | STREAM #A ($S_A$) | | STREAM #B ($S_B$) | |
| --- | --- | --- | --- | --- |
|  | ANTENNA #1 | ANTENNA #2 | ANTENNA #1 | ANTENNA #2 |
| INITIAL TIME | $w_\alpha$ | $w_\beta$ | $w_\gamma$ | $w_\delta$ |
| 1ST RETRANSMISSION | $w_\gamma$ | $w_\delta$ | $w_\alpha$ | $w_\beta$ |
| 2ND RETRANSMISSION | $w_\alpha$ | $w_\beta$ | $w_\gamma$ | $w_\delta$ |
| 3RD RETRANSMISSION | $w_\gamma$ | $w_\delta$ | $w_\alpha$ | $w_\beta$ |

FIG.5A

|  | ANTENNA #1 | ANTENNA #2 |
| --- | --- | --- |
| INITIAL TIME | $w_\alpha S_A + w_\gamma S_B$ | $w_\beta S_A + w_\delta S_B$ |
| 1ST RETRANSMISSION | $w_\gamma S_A + w_\alpha S_B$ | $w_\delta S_A + w_\beta S_B$ |
| 2ND RETRANSMISSION | $w_\alpha S_A + w_\gamma S_B$ | $w_\beta S_A + w_\delta S_B$ |
| 3RD RETRANSMISSION | $w_\gamma S_A + w_\alpha S_B$ | $w_\delta S_A + w_\beta S_B$ |

FIG.5B

|  | STREAM #A ($S_A$) | | STREAM #B ($S_B$) | |
| --- | --- | --- | --- | --- |
|  | ANTENNA #1 | ANTENNA #2 | ANTENNA #1 | ANTENNA #2 |
| INITIAL TIME | 0 | $\tau_\alpha$ | 0 | $\tau_\beta$ |
| 1ST RETRANSMISSION | 0 | $\tau_\beta$ | 0 | $\tau_\alpha$ |
| 2ND RETRANSMISSION | $\tau_\alpha$ | 0 | $\tau_\beta$ | 0 |
| 3RD RETRANSMISSION | $\tau_\beta$ | 0 | $\tau_\alpha$ | 0 |

FIG.10A

|  | ANTENNA #1 | | ANTENNA #2 | |
| --- | --- | --- | --- | --- |
|  | $S_A$ | $S_B$ | $S_A$ | $S_B$ |
| INITIAL TIME | 0 | 0 | $\tau_\alpha$ | $\tau_\beta$ |
| 1ST RETRANSMISSION | 0 | 0 | $\tau_\beta$ | $\tau_\alpha$ |
| 2ND RETRANSMISSION | $\tau_\alpha$ | $\tau_\beta$ | 0 | 0 |
| 3RD RETRANSMISSION | $\tau_\beta$ | $\tau_\alpha$ | 0 | 0 |

FIG.10B

RADIO TRANSMISSION APPARATUS AND RADIO TRANSMISSION METHOD

This application is a continuation of application Ser. No. 10/498,052 filed Jun. 9, 2004, which is a national phase under 35 USC 371 of PCT/JP2003/010200 filed Aug. 11, 2003, which is based on Japanese patent application 2002/268968 filed Sep. 13, 2002, the entire contents of each of which are incorporated by reference herein.

TECHNICAL FIELD

The present invention relates to a radio transmission apparatus and radio transmission method.

BACKGROUND ART

As a technology for realizing communications of large-volume data such as images, MIMO (Multi-Input Multi-Output) communications are being studied actively in recent years.

Among them, BLAST (Bell Laboratories Layered Space-Time) in particular is a focus of attention as an application capable of realizing high-speed transmission using an MIMO channel. This is a technique for transmitting mutually independent (or coded) streams from a plurality of transmission antennas and detecting the respective streams while repeating spatial filtering and removal of replicas on the receiving side.

Furthermore, when the MIMO channel information is known to the transmitting side, it is known that a greater channel capacity can be obtained. More specifically, this is realized by carrying out directivity control using an eigen vector obtained through singular value decomposition of a matrix which consists of the respective channel responses of the MIMO channels as elements and forming a spatially orthogonal channel (eigen channel). That is, when the MIMO channel information is known to the transmitting side, it is possible to form an orthogonal channel through multi-beam formation using the eigen vector, performing transmit power control through an irrigation theorem and thereby maximize the channel capacity (e.g., TECHNICAL REPORT OF IEICE RCS2002-53 (2002-05), Institute of Electronics, Information and Communication Engineers).

When the above described technology is applied to an actual apparatus, radio transmission is carried out after preparing a plurality of transmission systems capable of carrying out transmission processing on a plurality of transmission data streams and assigning weights by multiplying the transmission signals by their respective complex weights (hereinafter simply referred to as "weights").

When a bit error rate on the receiving side does not satisfy a predetermined value, an automatic retransmission request (ARQ; Automatic Repeat reQuest) is also generally practiced whereby the receiving side sends a retransmission request signal to the transmitting side and the transmitting side retransmits the same transmission data in response to this request.

Especially packet transmission which transmits data traffic is required to guarantee error-free data transmissions and therefore error control through ARQ is indispensable. In addition, when an adaptive modulation and error correction intended to improve the throughput by selecting an optimal modulation system or coding system according to the condition of a propagation path (path) are applied to packet transmission, it is not possible to avoid measuring errors or packet errors caused by a control delay, etc., and therefore the 3GPP (3rd Generation Partnership Project) also standardizes the use of a hybrid ARQ (hereinafter referred to as "HARQ") which incorporates an FEC (Forward Error Correction) function.

Therefore, by carrying out an MIMO communication using a plurality of antennas during data transmission to realize a large-volume data communication and retransmitting data when received data contains errors on the receiving side and by combining received data at the time of initial transmission with the received data at the time of retransmission using HARQ on the receiving side, a considerable improvement of throughput can be expected for this radio communication system.

However, even when received data contains errors and data is retransmitted, if a time variation of an environment of a propagation path which a transmission signal follows is slow (see FIG. 1), for example, when the communication apparatus is at rest or moving at a low speed, the diversity gain obtained with reception power on the receiving side is small, and therefore there is a problem that the throughput of the radio communication system hardly improves even if data is retransmitted.

This is because when the time variation of the propagation path environment is slow, a signal whose reception level is low at the time of initial transmission also has a low transmission level at the time of data retransmission, and therefore data cannot be demodulated correctly even if the data at the time of initial transmission and data at the time of retransmission are combined. Furthermore, when a multi-antenna technology such as MIMO or STC (Space-Time Coding) is used, if the time variation of the propagation path environment is slow, there is little variation in the fading condition between initial transmission and data retransmission, and the combined data cannot be demodulated correctly.

DISCLOSURE OF INVENTION

It is an object of the present invention to increase a diversity gain obtained through data retransmission when data retransmission is controlled by a radio communication system (e.g., adaptive array antenna technology, MIMO technology, STC technology, etc.) which transmits a plurality of data streams using a plurality of antennas.

This object is attained through a radio transmission apparatus and a radio transmission method which artificially changes the environment of a propagation path which data streams follow after the transmission from that at the time of previous transmission.

BRIEF DESCRIPTION OF DRAWINGS

FIG. 5A illustrates weights multiplied on transmission signals by a weight control section;

FIG. 5B illustrates weights multiplied on transmission signals by the weight control section;

FIG. 10A illustrates a delay time of a transmission signal for each transmission system;

FIG. 10B illustrates a delay time of a transmission signal for each transmission system;

BEST MODE FOR CARRYING OUT THE INVENTION

The present invention assumes roughly two cases for a method of changing a propagation path environment of a transmission signal. A first case is a method of changing weights to be multiplied on the transmission signal and a second case is a method of changing timings for transmitting the transmission signal.

With reference now to the attached drawings, embodiments of the present invention will be explained in detail below. Note that Embodiment 1 describes a case where a weight to be multiplied on a transmission signal is changed and Embodiment 2 describes a case where a timing for transmitting a transmission signal is changed.

(Embodiment 1)

Figure 1:
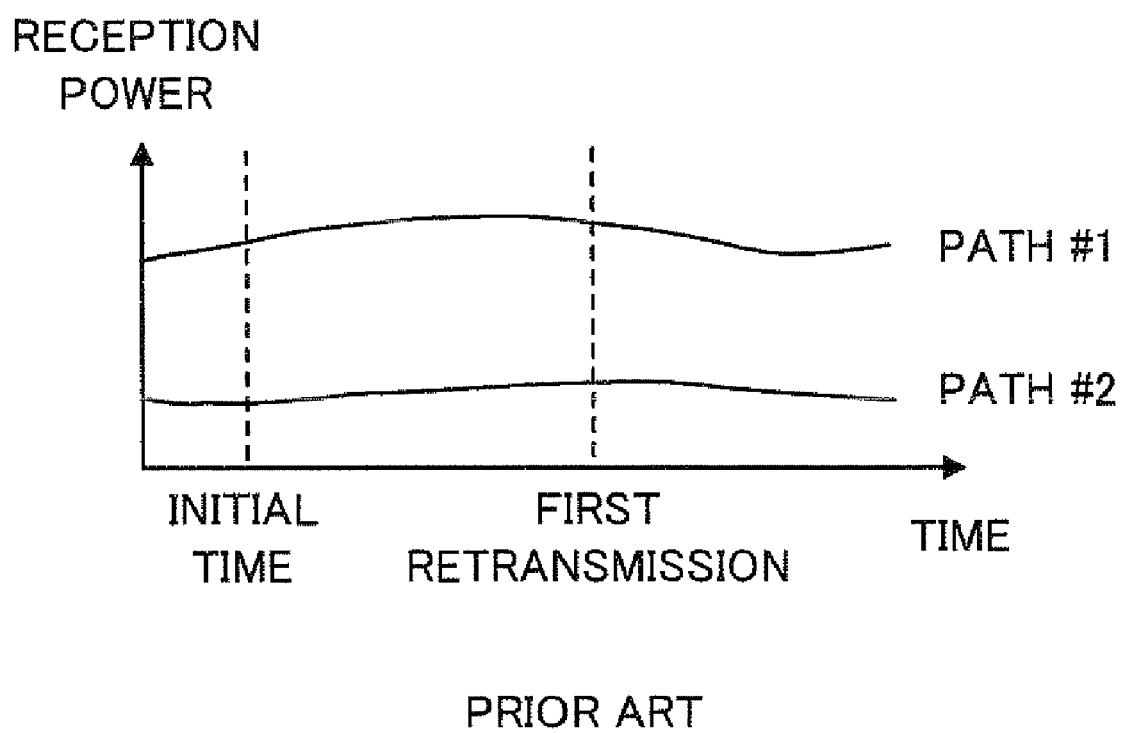
FIG. 1 illustrates reception power on a receiving side when a time variation of an environment of a propagation path which a transmission signal follows is slow.
Figure 2:
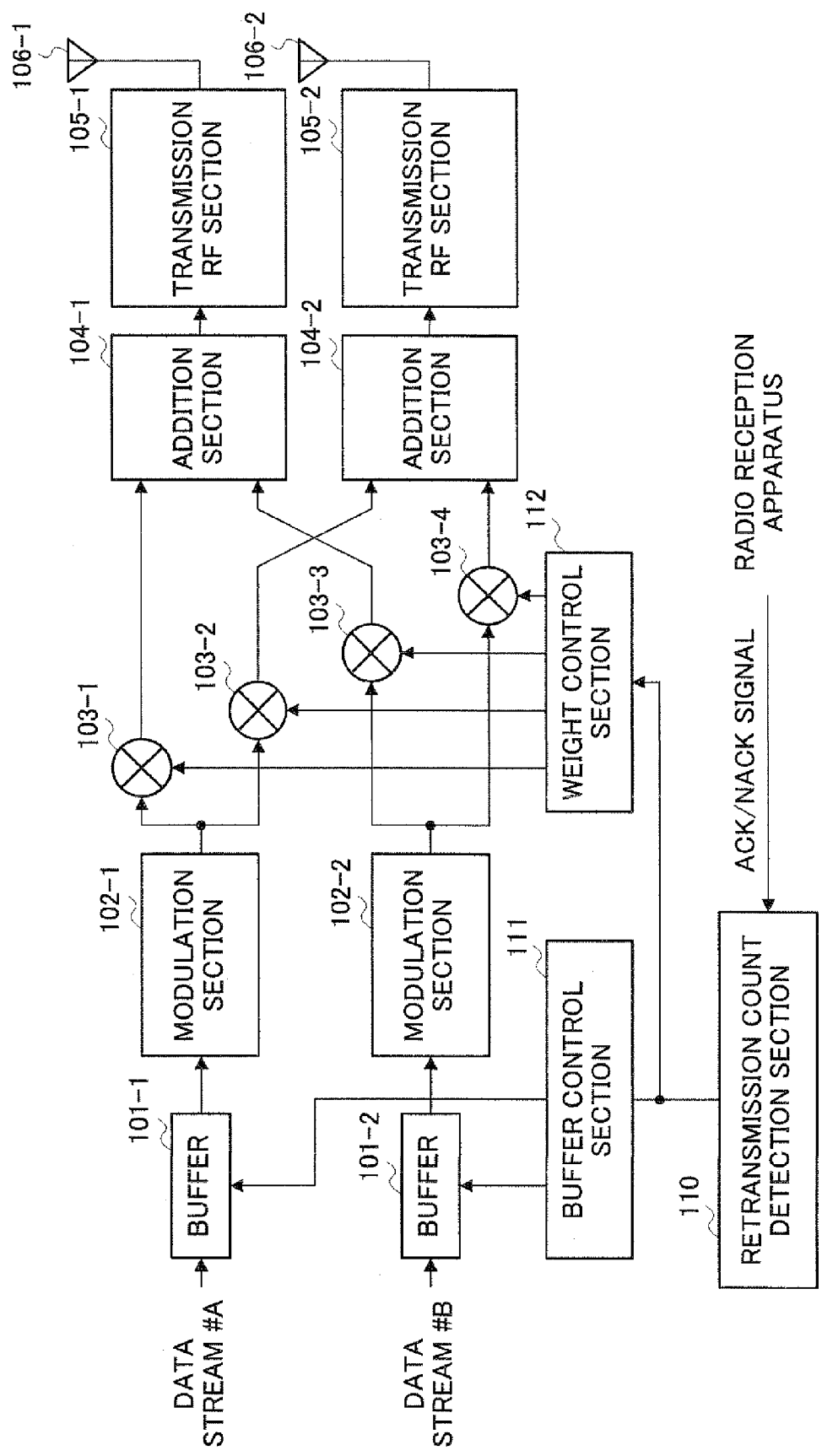
FIG. 2 is a block diagram showing a configuration of a radio transmission apparatus according to Embodiment 1 of the present invention.

FIG. 2 is a block diagram showing a configuration of a radio transmission apparatus according to Embodiment 1 of the present invention. Here, a case where two streams; data stream #A and data stream #B are transmitted using two antennas will be explained as an example.

The radio transmission apparatus shown in FIG. 2 is provided with buffers 101, modulation sections 102, multipliers 103, addition sections 104, transmission radio (RE) sections 105, transmission antennas 106, a retransmission count detection section 110, a buffer control section 111 and a weight control section 112.

In FIG. 2, the data stream #A is input to the buffer 101-1 and the data stream #B is input to the buffer 101-2.

The buffers 101-1 and 101-2 store the input data streams in preparation for a data retransmission request from a radio reception apparatus. Then, upon reception of an instruction for data transmission from the buffer control section 111, the buffers 101-1 and 101-2 output the data to the modulation sections 102-1 and 102-2.

The modulation section 102-1 carries out modulation processing on the data stream output from the buffer 101-1 and outputs the data stream. The signal output from the modulation section 102-1 is branched at some midpoint and output to the multipliers 103-1 and 103-2. Likewise, the modulation section 102-2 carries out modulation processing on the data stream output from the buffer 101-2 and outputs the data stream. The signal output from the modulation section 102-2 is branched at some midpoint and output to the multipliers 103-3 and 103-4.

The multiplier 103-1 multiplies the signal output from the modulation section 102-1 by a weight output from the weight control section 112 and outputs the weighted signal to addition section 104-1. On the other hand, the multiplier 103-2 multiplies the signal output from the modulation section 102-1 by a weight output from the weight control section 112 and outputs the weighted signal to addition section 104-2.

Likewise, the multiplier 103-3 multiplies the signal output from the modulation section 102-2 by a weight output from the weight control section 112 and outputs the weighted signal to addition section 104-1. On the other hand, the multiplier 103-4 multiplies the signal output from the modulation section 102-2 by a weight output from the weight control section 112 and outputs the weighted signal to addition section 104-2. The weights multiplied on the signals by the multipliers 103-1 to 103-4 will be described in more detail later.

The addition section 104-1 adds up the weighted signals output from the multipliers 103-1 and 103-3 and outputs the addition result to the transmission radio section 105-1. Likewise, the addition section 104-2 adds up the weighted signals output from the multipliers 103-2 and 103-4 and outputs the addition result to the transmission radio section 105-2.

The transmission radio section 105-1 carries out predetermined radio transmission processing such as up-conversion on the signal output from the addition section 104-1, converts the signal to a radio signal and sends the radio signal through the antenna 106-1. On the other hand, the transmission radio section 105-2 likewise carries out radio transmission processing on the signal output from the addition section 104-2 and sends the signal through the antenna 106-2.

The radio reception apparatus which has received the signals sent from the antennas 106-1 and 106-2 carries out error detection on the received signals and sends a NACK signal to the radio transmission apparatus according to this embodiment when an error is detected or sends an ACK signal when no error is detected.

The retransmission count detection section 110 detects a retransmission count of the data from the ACK/NACK signal notified from the above described radio reception apparatus and outputs the retransmission count to the buffer control section 111.

The buffer control section 111 outputs control signals of data output to the buffers 101-1 and 101-2 based on the retransmission count output from the retransmission count detection section 110. More specifically, when the radio reception apparatus sends a data retransmission request, the buffer control section 111 controls the buffers 101-1 and 101-2 so as to output the data stored at the time of the previous transmission again.

The weight control section 112 includes a table storing a plurality of types of weights, selects a weight to be multiplied on a transmission signal from the table according to the retransmission count detected by the retransmission count detection section 110 and outputs the weight to the multiplier 103. When data is retransmitted, it references the weight table again and outputs weights different from those at the time of initial transmission to the multipliers 103-1 to 103-4.

Figure 3:
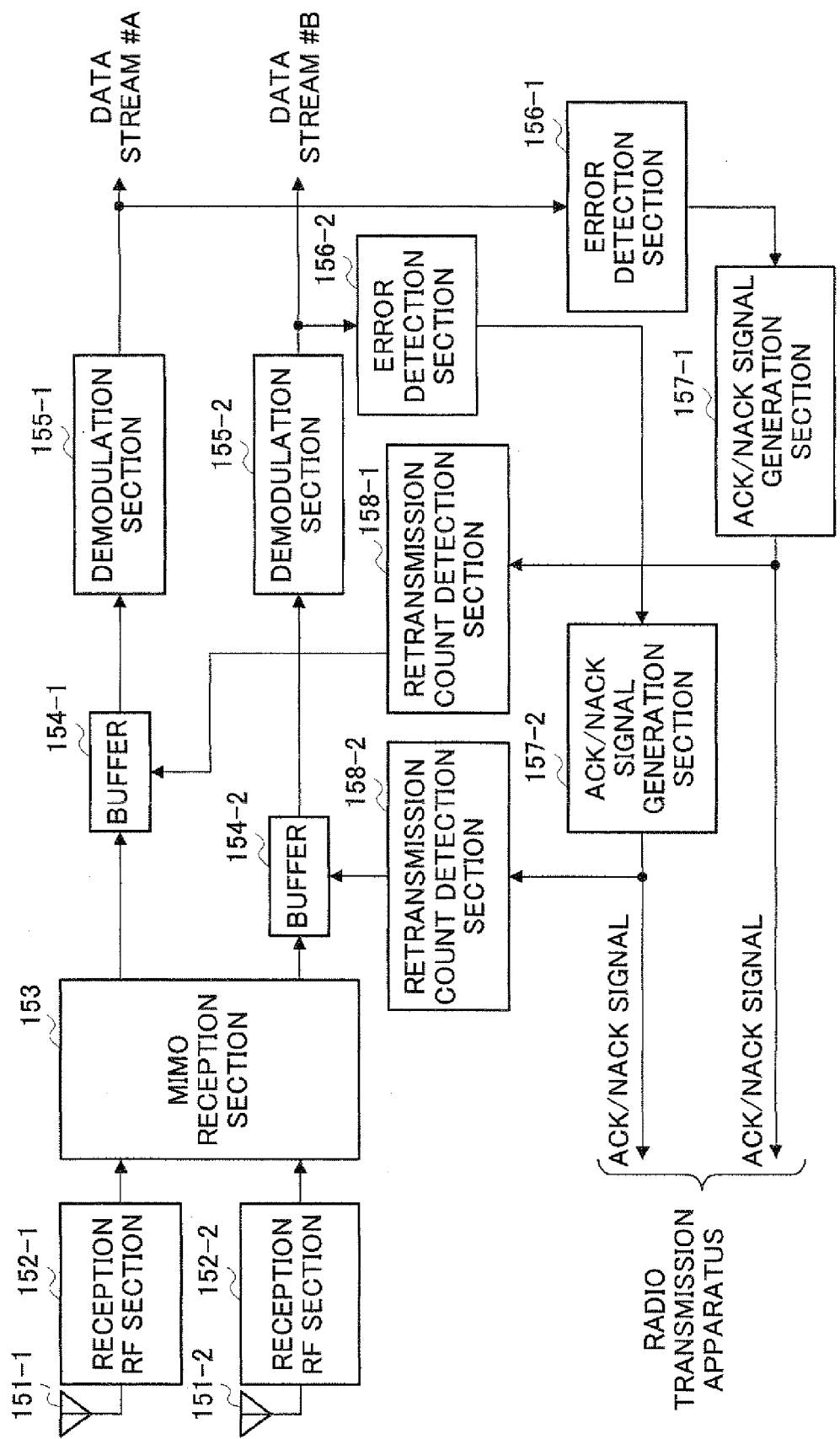
FIG. 3 is a block diagram showing a configuration of a radio reception apparatus according to Embodiment 1 of the present invention.

FIG. 3 is a block diagram showing a configuration of a radio reception apparatus according to this embodiment.

This radio reception apparatus is provided with reception antennas 151, reception radio (RF) sections 152, a MIMO reception section 153, buffers 154, demodulation sections 155, error detection sections 156, ACK/NACK signal generation sections 157 and retransmission count detection sections 158.

In FIG. 3, the reception radio (RF) sections 152 carry out predetermined radio processing such as down-conversion on signals received through the reception antennas 151 and outputs the signals to the MIMO reception section 153.

The MIMO reception section 153 separates the signals output from the reception radio sections 152 into two substreams, that is, streams #A and #B (MIMO reception processing) using propagation path characteristic information and outputs the streams to the respective buffers 154. This MIMO reception processing causes an inverse matrix of a matrix of 2 rows×2 columns consisting of characteristics of propagation paths which the respective signals sent from the two antennas on the transmitting side follow as elements to act on the received signals to thereby obtain two substreams.

In the case of packet data at the time of initial transmission, the buffers 154 immediately output this data to the demodulation sections 155. When a retransmission packet is sent, this data is temporarily stored and demodulated. When the packet is received correctly and an ACK signal is returned, the buffers are cleared. Being notified of the retransmission count from the retransmission count detection section 158, the buffer 154 can decide whether the packet is sent at the time of initial transmission or at the time of retransmission.

The demodulation sections 155 carry out demodulation processing on the data streams output from the buffers 154 and obtain data stream #A and data stream #B.

The error detection sections 156 detect errors and notify to the ACK/NACK signal generation sections 157 of the errors.

When notified from the error detection section 156 that an error has been detected, the ACK/NACK signal generation sections 157 generate a NACK signal and send the NACK signal to the radio transmission apparatus and retransmission count detection section 158 or when notified from the error detection sections 156 that no error has been detected, the ACK/NACK signal generation sections 157 send an ACK signal to the radio transmission apparatus and retransmission count detection section 158.

Figure 4:
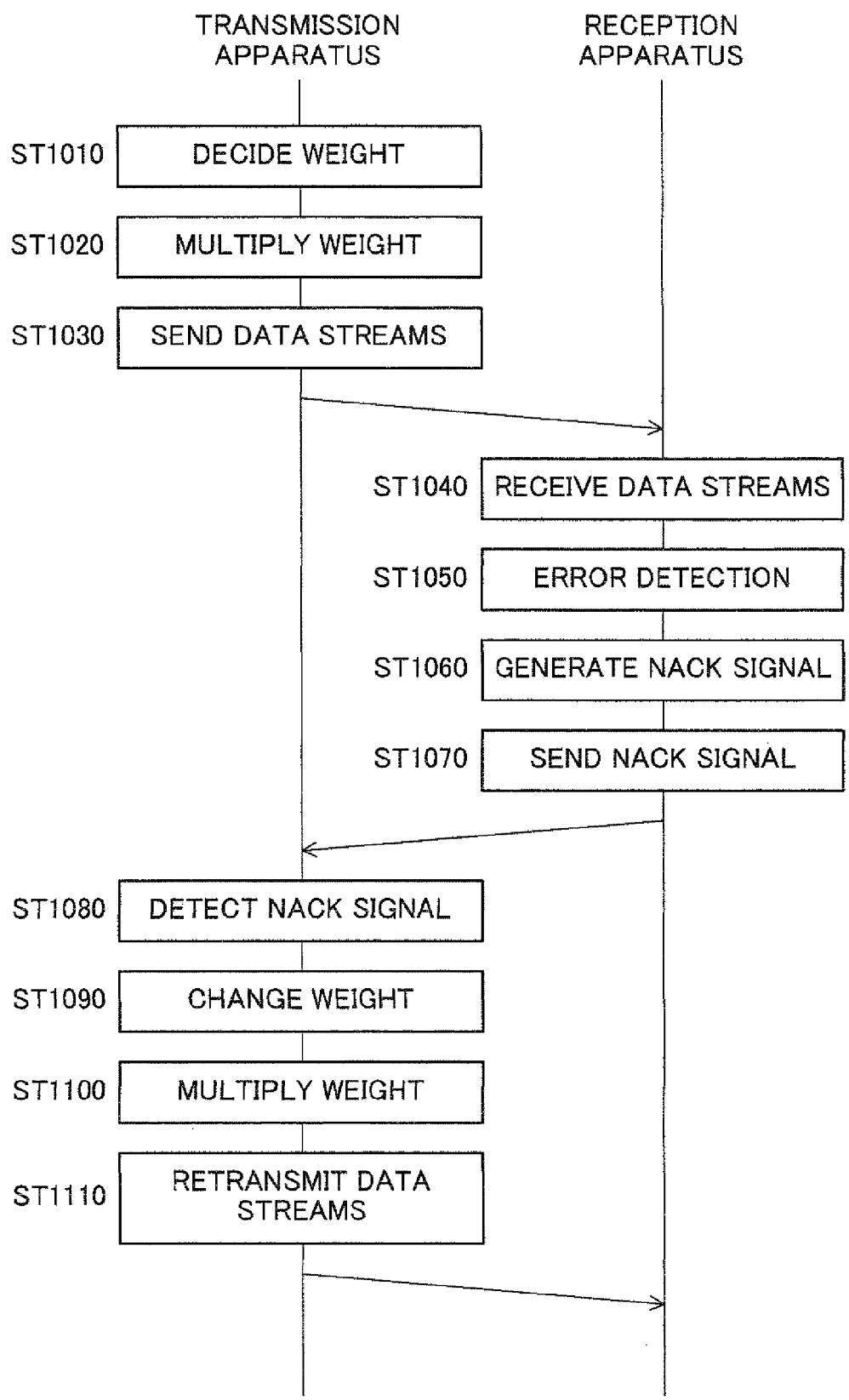
FIG. 4 is a sequence diagram showing a flow of radio communication according to Embodiment 1 of the present invention.

FIG. 4 is a sequence diagram showing a flow of radio communication realized by the above described configuration.

When sending a data stream, the transmission apparatus decides a weight to be multiplied on the transmission signal for each transmission system first (ST1010). Then, the transmission apparatus multiplies the transmission signal by this weight (ST1020) and sends a data stream (ST1030).

The reception apparatus receives the data stream sent from the above described transmission apparatus (ST1040) and detects a data error (ST1050). When some error is detected, the reception apparatus generates a NACK signal (ST1060) and sends the NACK signal to the above described transmission apparatus (ST1070).

The transmission apparatus which has detected the NACK signal notified from the reception apparatus (ST1080) changes the weight decided in ST1010 for each transmission system (ST1090), multiplies it on the transmission signal to be retransmitted (ST1100) and retransmits this signal to the reception apparatus (ST1110).

Then, an example of weights multiplied on a transmission signal under the control of the weight control section 112 will be explained using FIG. 5A and FIG. 5B.

FIG. 5A illustrates weights to be multiplied on transmission signals arranged for data stream #A($S_A$) and data stream B($S_B$). For example, at the time of initial transmission of data, stream #A is multiplied by weight $w_\alpha$ for the transmission system on the antenna 106-1 (hereinafter referred to as "antenna #1") side and multiplied by weight $w_\beta$ for the transmission system on the antenna 106-2 (hereinafter referred to as "antenna #2").

Furthermore, stream #B is multiplied by weight $w_\gamma$ for the transmission system on the antenna #1 side and multiplied by weight $w_\delta$ for the transmission system on the antenna #2 side.

Then, at the first retransmission, stream #A is multiplied by weight $w_\gamma$ for the transmission system on the antenna #1 side and multiplied by weight $w_\delta$ for the transmission system on the antenna #2 side. Furthermore, stream #B is multiplied by weight $w_\alpha$ for the transmission system on the antenna #1 and multiplied by weight $w_\beta$ for the transmission system on the antenna #2 side That is, here, the weight used for the data stream #A at the time of initial transmission is used for the data stream #B for the first retransmission. Furthermore, the weight used for the data stream #B at the time of initial transmission is used for the data stream #A for the first retransmission. At the time of the initial transmission and first retransmission, weights used for the stream #A and stream #B are switched round.

At the second retransmission, weights used for the stream #A and stream #B are switched round and the same weights as those at the time of initial transmission are used. At the third retransmission, weights used for the stream #A and stream #B are further switched round and the same weights as those at the first retransmission are used. That is, every time retransmission is repeated, weights used for the stream #A. and stream #B are switched round.

Here, weights to be multiplied on transmission signals arranged for the antenna #1 and antenna #2 from the different standpoint are shown in FIG. 5B. That is, this figure shows what signals are actually sent from the antenna #1 and antenna #2. The contents shown in FIG. 5A and FIG. 5B are substantially the same.

Then, effects resulting from changes of weights between the initial transmission and retransmission will be explained. When a weight is multiplied on a transmission signal, the transmission signal acquires directivity. However, this directivity does not mean that the transmission signal is actually propagating in a specific direction as seen in the formation of beams by an array antenna technology, but it is a matter of mathematical expressions. This is because while there is a low fading correlation between antennas in the MIMO communication, there is a high fading correlation between antennas in the array antenna technology. However, this expression is used in studying effects of weight multiplication of this embodiment because explaining with an image that a transmission signal is actually propagating with directivity facilitates an understanding.

Figure 6:
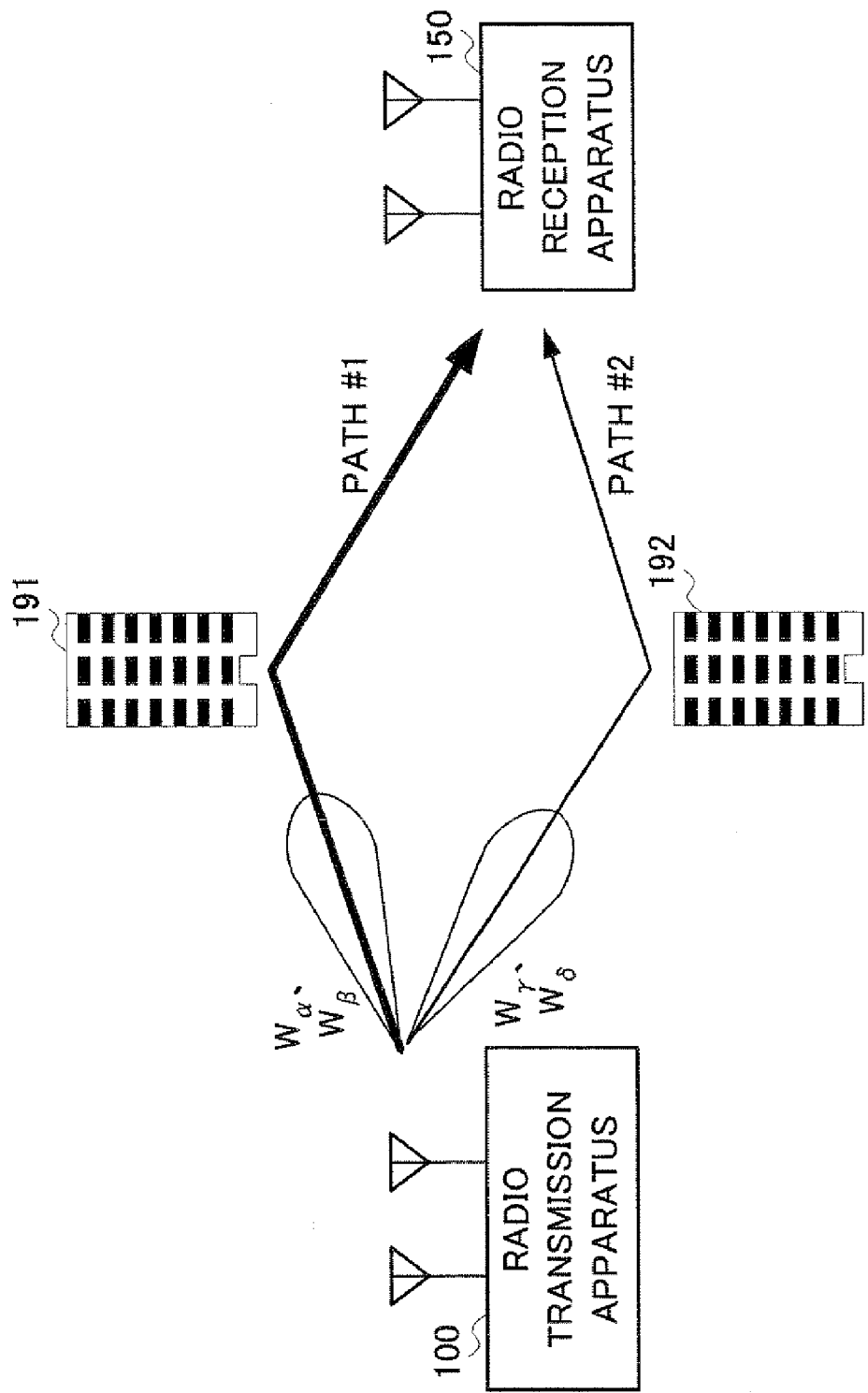
FIG. 6 is a conceptual view illustrating directivity of a transmission signal.

FIG. 6 is a conceptual view illustrating directivity of a transmission signal. Signals sent from a radio transmission apparatus 100 using weights $w_\alpha$ and $w_\beta$ o follow a path #1 represented by a thick line, are reflected at some midpoint by a building 191 and reach a radio reception apparatus 150 without any significant reduction of their intensity. On the other hand, signals sent using weights $w_\gamma$ and $w_\delta$ follow a path#2 represented by a thin line, are reflected at some midpoint by a building 192 and reach the radio reception apparatus 150 affected by the propagation path with their intensity significantly weakened.

At the time of initial transmission, the stream #A multiplied by weights $w_\alpha$ and $w_\beta$ follows the path #1 and the stream #B multiplied by weights $w_\alpha$ and $w_\beta$ follows the path #2. Then, at the time of retransmission the weights to be multiplied on the transmission signals are switched round, and therefore the stream #A follows the path #2 and the stream #B follows the path #1.

FIG. 7A, FIG. 7B, FIG. 8A and FIG. 8B show quality comparisons between signals sent from a conventional radio transmission apparatus and signals sent from the radio transmission apparatus according to this embodiment. These figures show conceptual views illustrating the quality (bar graphs) of received signals after being combined on the receiving side and a level L1 at which data can be received correctly.

Figure 7A:
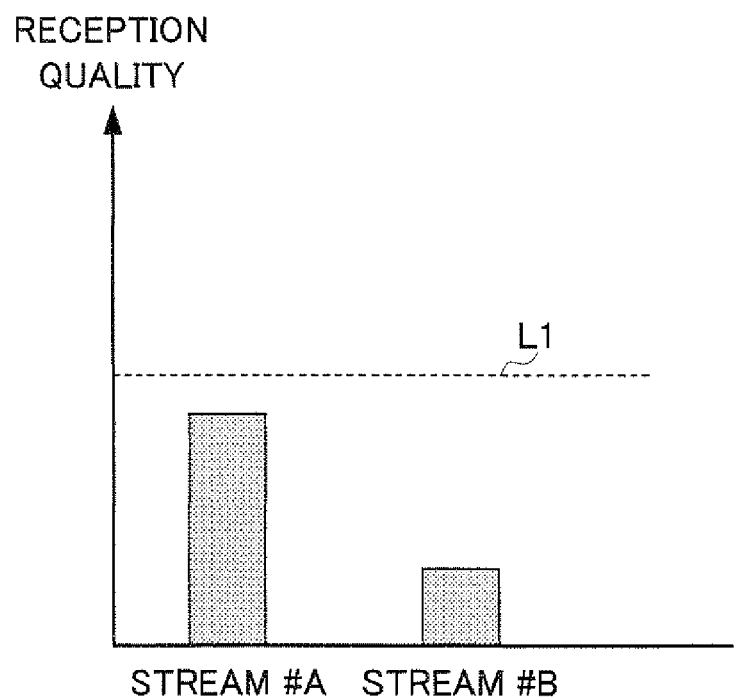
FIG. 7A illustrates quality on the receiving side of a signal transmitted from a conventional radio transmission apparatus.
Figure 7B:
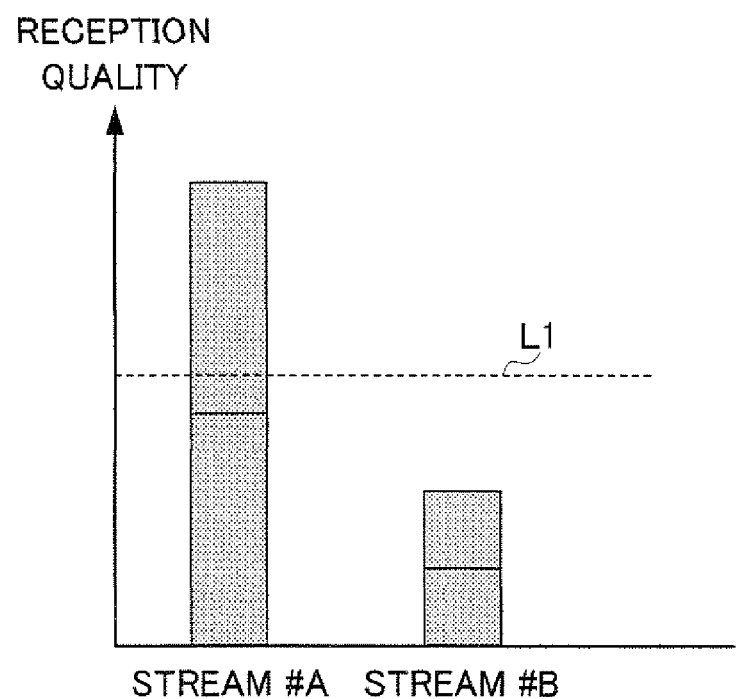
FIG. 7B illustrates quality on the receiving side of a signal transmitted from the conventional radio transmission apparatus.

FIG. 7A and FIG. 7B show cases of the conventional radio transmission apparatus. FIG. 7A illustrates reception quality at the time of initial transmission and FIG. 7B illustrates reception quality at the time of data retransmission.

In FIG. 7A, the quality level of the received signal of none of the stream #A and the stream #B exceeds the level L1. At this time, the receiving side cannot receive data correctly, and therefore sends back a NACK signal to the transmitting side and the transmitting side retransmits the data. However, when the time variation of the propagation path environment is small. no significant improvement of the reception quality on the receiving side can be expected even at the time of data retransmission. Thus, as shown in FIG. 7B, by combining the received signal at the time of initial transmission and the received signal at the time of data retransmission after the data retransmission, the reception quality after the combination of the stream #A which had original reception quality at a level close to the level L1 at the time of initial transmission exceeds the level L1. On the other hand, even if data is retransmitted, the reception quality of the stream #B after the combination cannot exceed the level L1. Thus, the receiving side sends back an NACK signal to the transmitting side several times more until the reception quality of the stream #B exceeds the level L1 and the transmitting side retransmits data every time the NACK signal is sent.

Figure 8A:
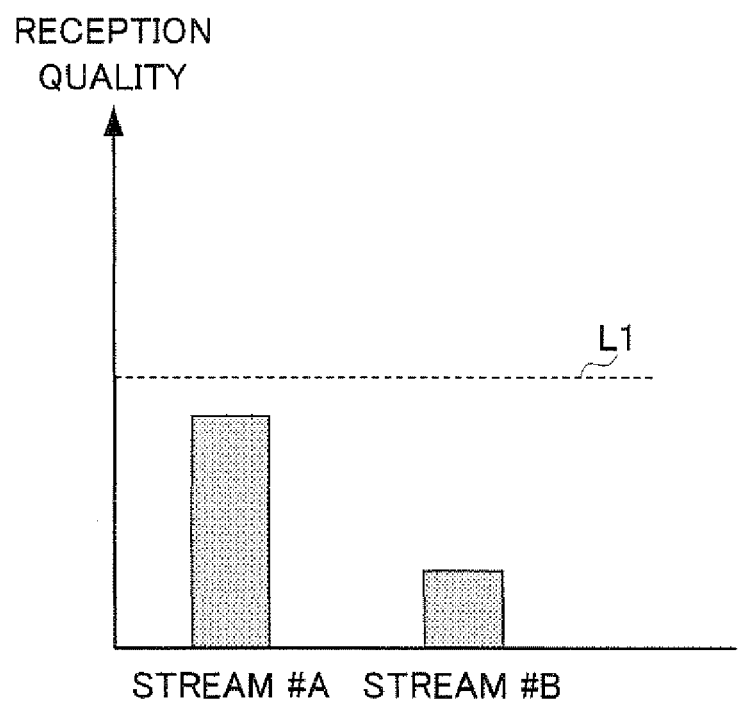
FIG. 8A illustrates quality on the receiving side of a signal transmitted from the radio transmission apparatus according to Embodiment 1 of the present invention.
Figure 8B:
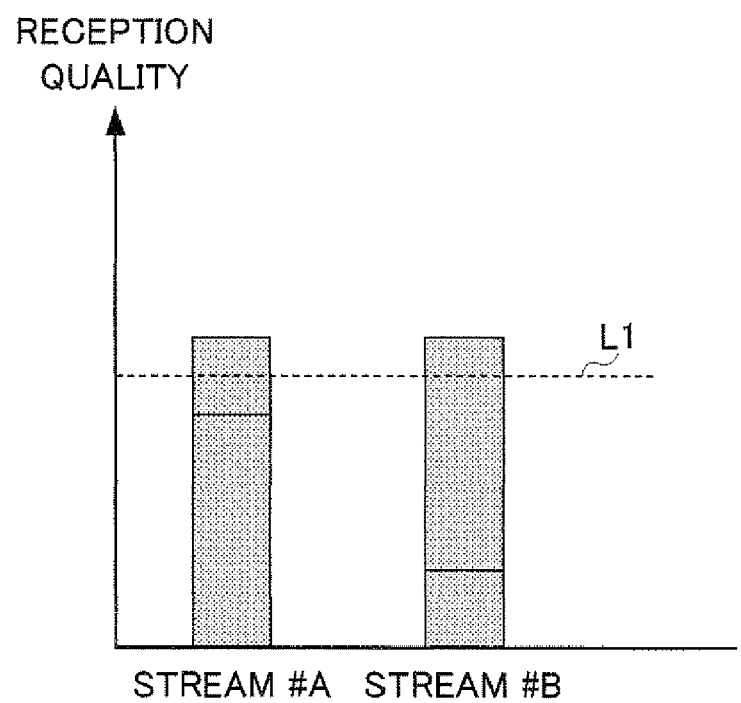
FIG. 8B illustrates quality on the receiving side of a signal transmitted from the radio transmission apparatus according to Embodiment 1 of the present invention.

FIG. 8A and FIG. 8B show the case of the radio transmission apparatus according to this embodiment. FIG. 8A illustrates reception quality at the time of initial data transmission and FIG. 8B illustrates reception quality at the time of data retransmission.

FIG. 8A is the same as FIG. 7A. None of the reception quality levels of the stream #A and stream #B exceeds the level L1. However, at the time of retransmission, weights used for the stream #A and stream #B are switched round, and therefore the environments of propagation paths which the stream #A and stream #B follow are placed in a condition as if those environments are averaged. In this way, both the reception quality levels of the streams #A and #B after combining the received signals at the time of initial transmission and at the time of retransmission exceed the level L1, and it is therefore possible to receive signals correctly.

In the above described configuration, the weight control section 112 of the radio reception apparatus according to this embodiment changes weights to be multiplied on the transmission signal from the weights used for the previous transmission every time data is retransmitted.

This causes each data stream to be sent to the receiving side through different propagation path environments between the previous transmission and retransmission, and therefore the probability that the same data may contain errors successively is reduced and as a result, the data error rate characteristic after packet combination improves. In other words, a diversity gain when the retransmission data is combined on the receiving side increases and the reception performance on the receiving side improves.

Furthermore, the weight control section 112 of the radio reception apparatus according to this embodiment switches round the weights corresponding to the respective antennas at the time of the previous transmission and multiplies the transmission signals by those weights every time data is retransmitted.

For example, as shown in FIG. 7A or FIG. 8A, even if the receiving side sends back a NACK signal at the time of initial transmission, reception quality of all data streams is not averagely bad but it is often the case that reception quality of only some data streams is bad.

At this time, by switching round weights to be multiplied on the transmission signals between previous transmission and retransmission, the propagation path environments for the respective data streams are switched round and averaged, and therefore the reception quality improves at an early stage.

Furthermore, since the weights already used at the time of the previous transmission are reused at the time of retransmission by only switching round the signals to be multiplied, and therefore there is no need for processing such as feeding back other information, for example, the propagation path information detected on the receiving side to the transmitting side.

Thus, according to this embodiment, weights to be multiplied on transmission signals are switched round between the initial transmission and retransmission, and therefore it is possible to increase a diversity gain obtained through data retransmission and improve reception performance on the receiving side.

Note that here a case where transmission data consists of two streams #A and #B has been explained as an example, but the number of data streams can be three or more, and in this case, it is possible to use weights to be used at the time of data retransmission in rotation every time data is retransmitted. That is, in the case of three data streams, the weights used at the time of the initial transmission are reused at the third retransmission.

Furthermore, here, a MIMO transmission having a low fading correlation between antennas has been explained, but it is also possible to use an array antenna having a high fading correlation between antennas. At this time, antennas are arranged so that the fading correlation between antennas becomes substantially 1. Directivity patterns as shown in FIG. 6 are formed by multiplying transmission signals by weights. The stream #A multiplied by weights $w_\alpha$ and $w_\beta$ at the time of the initial transmission follows the path #1 and the stream #B multiplied by weights $w_\alpha$ and $w_\beta$ follows the path #2. Then, at the time of retransmission, weights to be multiplied on the transmission signals are switched round, and therefore the stream #A follows the path #2 and the stream #B follows the path #1. This makes it possible to average propagation path environments as with the above described case.

Here, a case where weights of the stream #A and stream #B are switched round at the time of data retransmission has been explained as an example, but it is also possible to select not the weights used at the time of the previous transmission but totally different values as weights for retransmission.

Furthermore, here a case where the propagation path information, etc., detected on the receiving side is not fed back to the transmitting side has been explained as an example, but for a radio transmission apparatus in which channel quality information is fed back from the receiving side to the transmitting side for the purpose of increasing the channel capacity and weights are decided so that more power is assigned to channels of good quality, it is also possible to fine-tune weights based on this fed back channel quality information and assign weights so that the channel quality exceeds the minimum level L1 in all paths.

(Embodiment 2)

Figure 9:
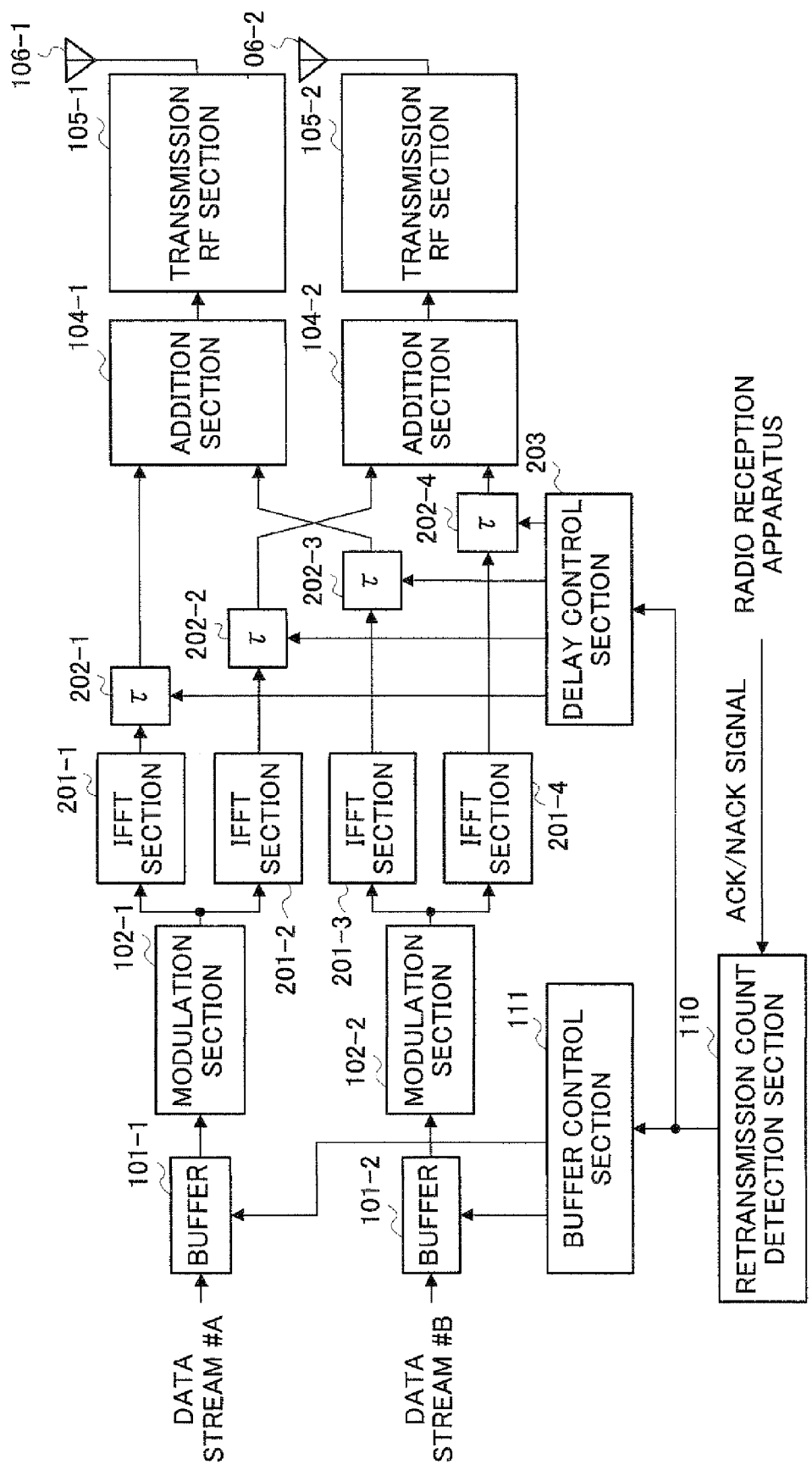
FIG. 9 is a block diagram showing a configuration of a radio transmission apparatus according to Embodiment 2 of the present invention.

FIG. 9 is a block diagram showing a configuration of a radio transmission apparatus according to Embodiment 2 of the present invention. This radio transmission apparatus has the same basic configuration as that of the radio transmission apparatus shown in FIG. 2 and the same components are assigned the same reference numerals and explanations thereof will be omitted.

Features of this embodiment include that it is provided with IFFT sections 201, delay sections 202 and a delay control section 203, it carries out a communication based on an OFDM scheme, adds delay times which differ from one transmission data stream to another, transmits the data streams through their respective antennas at different transmission timings at the time of transmission and thereby drastically changes the characteristic of a received signal on the frequency axis. Therefore, it is possible to drastically change the propagation path environment every time retransmission is performed. Furthermore, transforming data into a multicarrier according to the OFDM scheme makes it possible to multiplex delay signals with different delay times and send the multiplexed signals.

Then, an operation of the radio transmission apparatus in the above described configuration will be explained.

The modulation section 102-1 carries out modulation processing on a data stream output from the buffer 101-1 and outputs the data stream. The signal output from the modulation section 102-1 is branched at some midpoint and output to the IFFT sections 201-1 and 201-2. Likewise, the modulation section 102-2 carries out modulation processing on a data stream output from the buffer 101-2 and outputs the data stream. The signal output from the modulation section 102-2 is branched at some midpoint and output to the IFFT sections 201-3 and 201-4.

On the other hand, the delay control section 203 includes a table storing a plurality of types of delay times, selects a delay time for each transmission signal from the table according to a retransmission count notified from the retransmission count detection section 110 and outputs the delay time to the delay sections 202-1 to 202-4. The delay times output from the delay control section 203 will be explained in more detail later.

The delay section 202-1 delays the transmission timing of the signal output from the IFFT section 201-1 by a delay time output from the delay control section 203 and outputs the delayed signal to the addition section 104-1. Furthermore, the delay section 202-2 delays the transmission timing of the signal output from the IFFT section 201-2 by a delay time output from the delay control section 203 and outputs the delayed signal to the addition section 104-2.

Likewise, the delay section 202-3 delays the transmission timing of the signal output from the IFFT section 201-3 by a delay time output from the delay control section 203 and outputs the delayed signal to the addition section 104-1. Furthermore, the delay section 202-4 delays the transmission timing of the signal output from the IFFT section 201-4 by a delay time output from the delay control section 203 and outputs the delayed signal to the addition section 104-2.

The addition section 104-1 adds up the signals output from the delay sections 202-1 and 202-3, the transmission timings of which have been delayed and outputs the addition result to the transmission radio section 105-1. Likewise, the addition section 104-2 adds up the signals output from the delay sections 202-2 and 202-4, the transmission timings of which have been delayed and outputs the addition result to the transmission radio section 105-2. The processing thereafter is the same as that in Embodiment 1.

Then, an example of a delay time added to a transmission signal of each system will be explained using FIG. 10A and FIG. 10B.

FIG. 10A shows delay times of transmission timings of transmission signals arranged for data stream #A($S_A$) and data stream #B($S_B$). For example, at the time of initial data transmission, the delay time of the stream #A is 0 for the transmission system on the antenna #1 side and $\tau_\alpha$ for the transmission system on the antenna #2 side. Furthermore, the delay time of the stream #B is 0 for the transmission system on the antenna #1 side and $\tau_\beta$ for the transmission system on the antenna #2 side.

Then, at the first retransmission, the delay time of the stream #A is 0 for the transmission system on the antenna #1 side and $\tau_\beta$ for the transmission system on the antenna #2 side. Furthermore, the delay time of the stream #B is 0 for the transmission system on the antenna #1 side and $\tau_\alpha$ for the transmission system on the antenna #2 side.

That is, the combination of delay times of the data stream #A at the time of the initial transmission is applied to the data stream #B at the time of the first retransmission. Furthermore, the combination of delay times used for the data stream #B at the time of the initial transmission is applied to the data stream #A at the first retransmission. The combinations of delay times used for the stream #A and stream #B at the time of the initial transmission are switched round at the time of the first retransmission.

At the time of the second retransmission, the delay time used for the transmission system on the antenna #1 side and the delay time used for the transmission system on the antenna #2 side at the time of the initial transmission are switched round. That is, the delay time of the stream #A is $\tau_\alpha$ for the transmission system on the antenna #1 side and 0 for the transmission system on the antenna #2 side, and the delay time of the stream #B is $\tau_\beta$ for the transmission system on the antenna #1 side and 0 for the transmission system on the antenna #2 side. At the third retransmission, the delay times used for the stream #A and stream #B are further switched round.

Now, by changing the standpoint, delay times of transmission signals arranged for the antenna #1 and antenna #2 are shown in FIG. 10B. That is, this figure shows how signals are actually delayed and sent through the antenna #1 and antenna #2. The contents shown in FIG. 10A and FIG. 10B are substantially the same.

Figure 11:
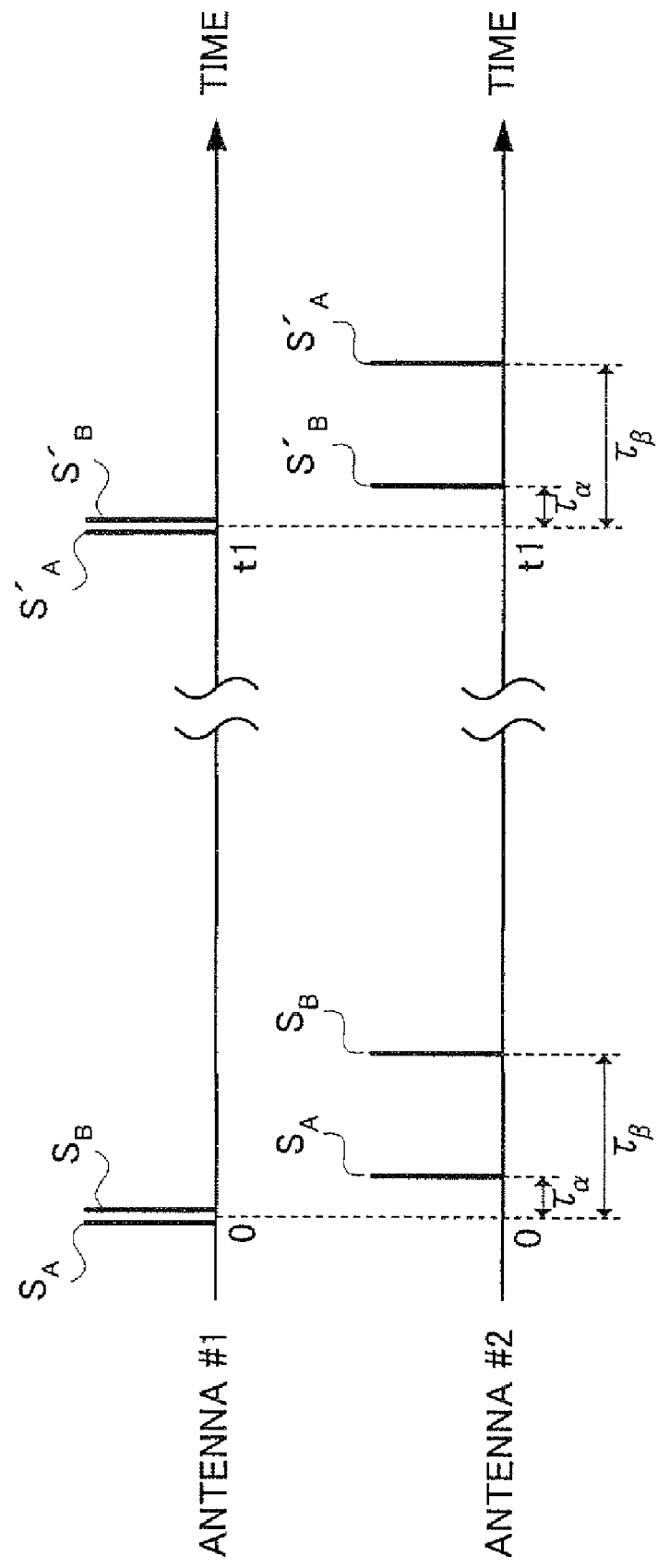
FIG. 11 illustrates transmission timings of a transmission signal.

FIG. 11 shows transmission timings of signals transmitted from the above described radio transmission apparatus on the time axis. Note that the actual transmission data streams are weighted (e.g., the signals transmitted from the antenna #1 are $w_\alpha S_A + w_\gamma S_B$ as described above), but the same weights at the time of the initial transmission are also used at the time of the retransmission in this embodiment, and therefore notations of weights will be omitted to make it easier to distinguish one signal from another.

This figure shows that initial data transmission is performed at time 0 and data retransmission is performed at time t1 after a lapse of a certain time. From the antenna #1, data stream #A ($S_A$, $S'_A$) and data stream #B ($S_B$, $S'_B$) are transmitted at the same timing for both the initial transmission and retransmission. On the other hand, from the antenna #2, $S_A$ and $S_B$ are transmitted with delay times $\tau_\alpha$ and $\tau_\beta$, respectively at the time of initial transmission, while $S'_A$ and $S'_B$ are transmitted with delay times $\tau_\beta$ and $\tau_\alpha$, respectively at the time of retransmission.

Here, when attention is focused on the data stream #A($S_A$) at the time of the initial transmission, $S_A$ is transmitted with a time difference $\tau_\alpha$ provided between the antenna #1 and antenna #2. This is intended to reduce a fading correlation between the antennas. On the other hand, when attention is focused on the data stream #A($S'_A$) at the time of the retransmission, the time difference provided between the antenna #1 and antenna #2 is $\tau_\beta$. That is, transmission is carried out in such a way that the fading correlation between the antennas is changed at the time of the initial transmission and at the time of the retransmission. The also applies to the data stream #B($S_B$, $S'_B$) in like fashion, Furthermore, when attention is focused on both $S_A$ and $S_B$ transmitted from the antenna #2 at the time of the initial transmission, $S_B$ is transmitted ($\tau_\beta$-$\tau_\alpha$) behind $S_A$. On the other hand, at the time of the retransmission, $S'_A$ is transmitted ($\tau_\beta$-$\tau_\alpha$) behind $S'_B$ on the contrary. This means that transmission is carried out in such a way that the difference in transmission timings between the data stream #A and data stream #B (including the relationship as to which is ahead and which is behind) is changed at the time of the initial transmission and at the time of the retransmission. Here, for simplicity of explanation, attention has been focused only on the data stream transmitted from the antenna #2, but the same thing is also applied when the data stream transmitted from the antenna #1 is taken into consideration together.

Figure 12A:
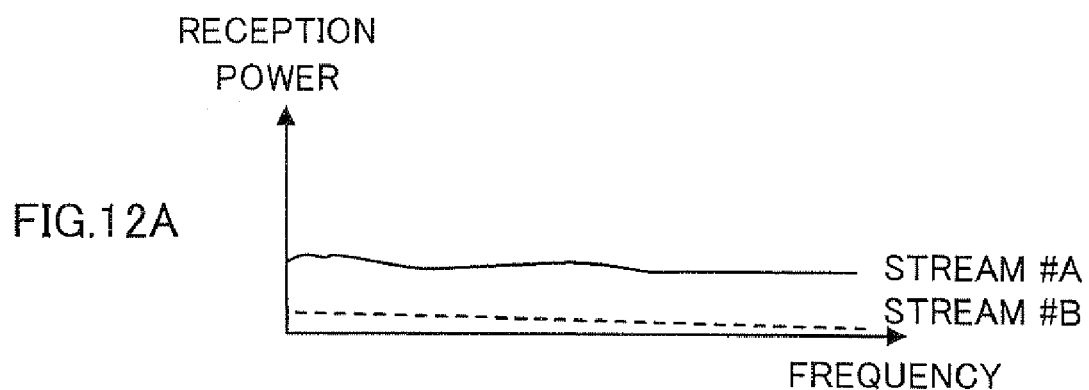
FIG. 12A illustrates reception power of a conventional apparatus.
Figure 12B:
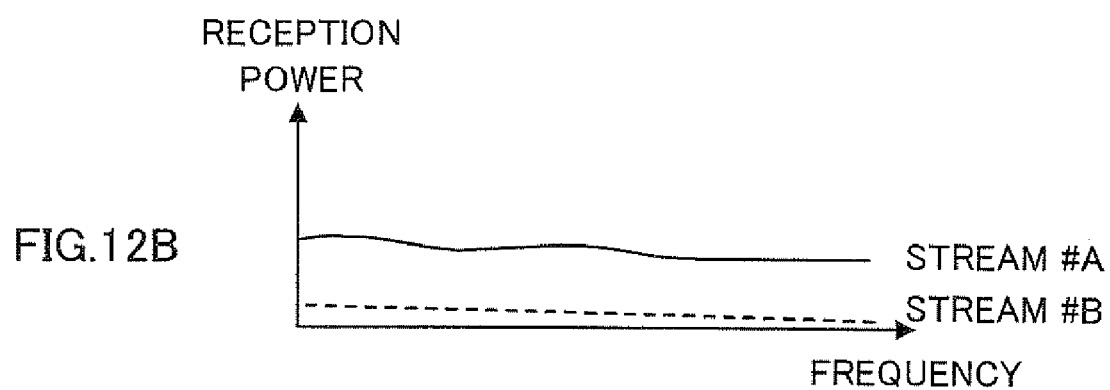
FIG. 12B illustrates reception power of the conventional apparatus.
Figure 12C:
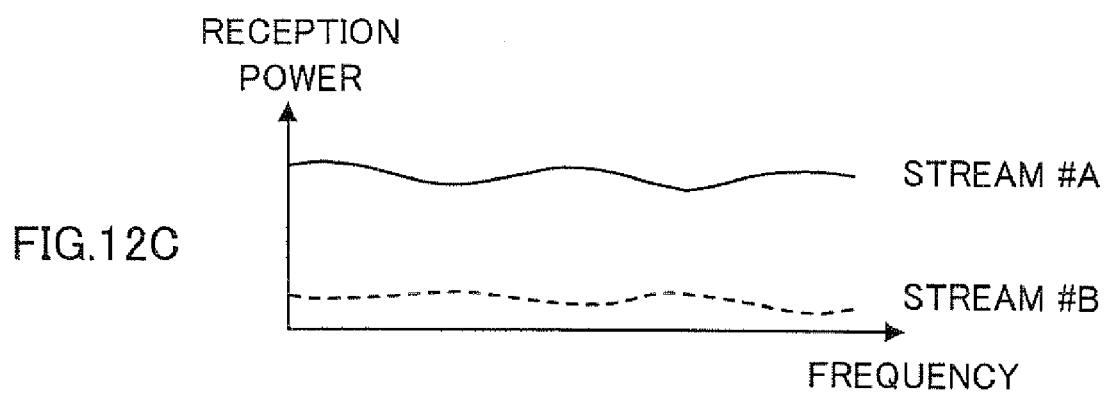
FIG. 12C illustrates reception power of the conventional apparatus.

The effect of changing the difference in transmission timings between data streams at the time of the initial transmission and at the time of the retransmission will be explained below. Speaking plainly, frequency selective fading is a result of signals with the same frequency and a phase difference of 180 degrees weakening each other. Thus, by intentionally delaying transmission timings of transmission signals, that is, shifting phases, it is possible to change a fading characteristic that a signal receives. FIG. 12A to FIG. 12C show reception power at a conventional apparatus. A stream #A keeps a high reception level both at the time of initial transmission (see FIG. 12A) and at the time of retransmission (see FIG. 12B), while a stream #B keeps a low reception level both at the time of initial transmission and at the time of retransmission. Therefore, even if the data at the time of the initial transmission and the data at the time of the retransmission are combined (see FIG. 12C), only the stream #A reaches the level for correct reception and the stream #B remains at levels where it cannot be received correctly.

Figure 13A:
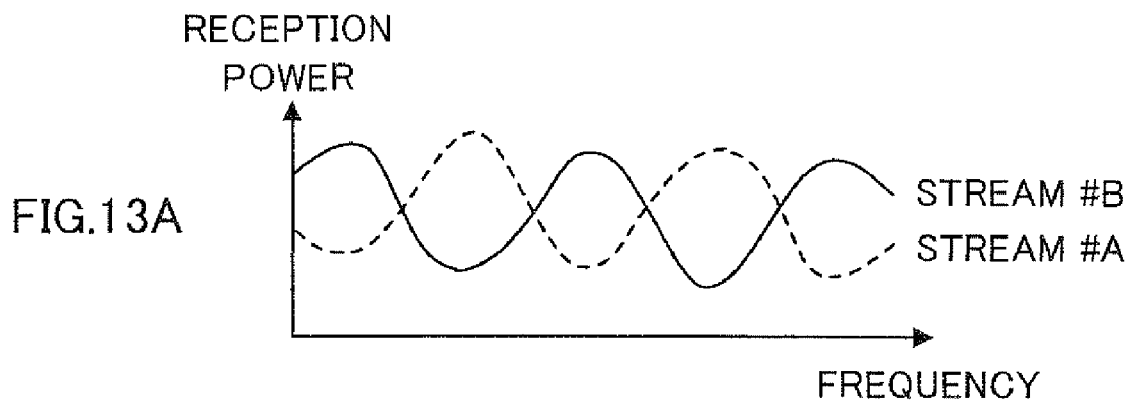
FIG. 13A illustrates reception power according to Embodiment 2 of the present invention.
Figure 13B:
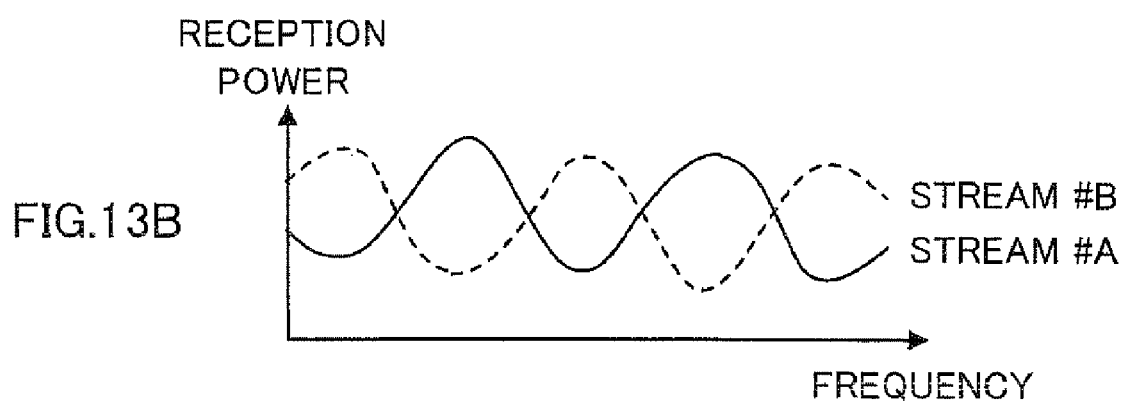
FIG. 13B illustrates reception power according to Embodiment 2 of the present invention.
Figure 13C:
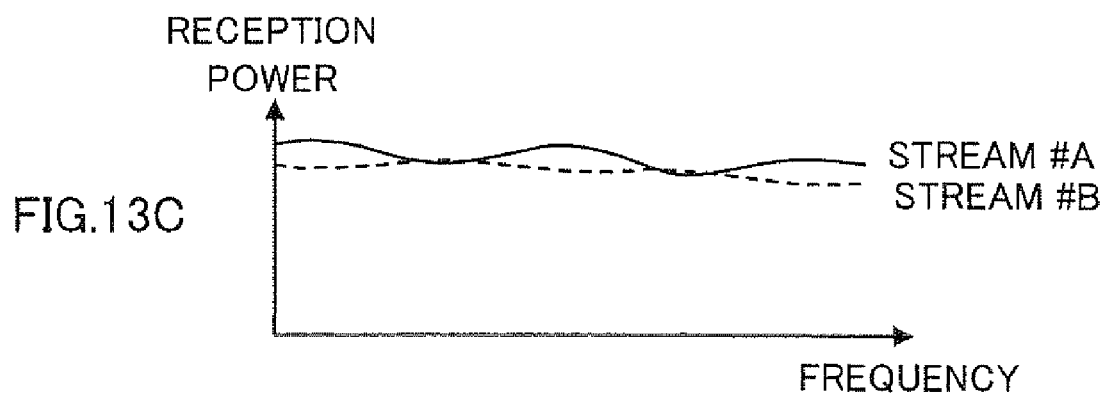
FIG. 13C illustrates reception power according to Embodiment 2 of the present invention.

FIG. 13A to FIG. 13C show reception power according to this embodiment. The levels of received signals are affected by frequency selective fading which differs between the streams. Therefore, the pattern of the reception level on the frequency axis differs between the streams. At the time of initial transmission (see FIG. 13A) and at the time of retransmission (see FIG. 13B), delay processes applied to the stream #A and stream #B are switched round, and therefore the levels of signals after being combined on the receiving side are averaged (see FIG. 13C) and both the stream #A and stream #B can be demodulated correctly.

Here, the figures describe a situation in which the phase of the fading characteristic curve on the frequency axis is shifted by 180 degrees by delaying transmission signals. However, it will be sufficient to change the fading characteristic only to a certain degree by delaying transmission signals in this embodiment, and the phase need not always be shifted by 180 degrees. Note that the fluctuation pitch of the fading characteristic depends on the moving speed of a mobile station and the frequency band used for communications, and therefore it is possible to calculate a delay time for shifting the phase of the fading characteristic curve by 180 degrees.

Furthermore, when the propagation path information such as channel quality is fed back from the receiving side to the transmitting side in the above described configuration as in the case of Embodiment 1, it is also possible to fine-tune delay times based on this fed back propagation path information.

Thus, according to this embodiment, variations in the reception level are averaged on the frequency axis of each stream for every retransmission, and therefore it is possible to demodulate the combined signal correctly and improve the reception performance on the receiving side.

Note that Embodiment 1 and Embodiment 2 can be used in combination. That is, it is possible to further add a delay time to a transmission signal multiplied by a weight to delay the transmission timing and transmit the delayed signal. At this time, the effects of the respective embodiments are superimposed, making it possible to further improve the reception performance.

As described above, the present invention allows a radio communication system which transmits a plurality of data streams using a plurality of antennas (e.g., adaptive array antenna technology, MIMO technology, STC technology, etc.) to increase, for example, when HARQ is applied, a diversity gain at the time of data retransmission and improve the reception performance on the receiving side.

This application is based on the Japanese Patent Application No. 2002-268968 filed on Sep. 13, 2002, entire content of which is expressly incorporated by reference herein.

Industrial Applicability

The present invention is applicable to a radio transmission apparatus and radio transmission method to which an adaptive array antenna technology, MIMO technology or STC technology, etc., is applied.

What is claimed is:

1. A transmission apparatus comprising:
   a multiplier that multiplies a plurality of streams by a plurality of weights; and
   a transmitter that transmits the plurality of streams multiplied with the weights using a plurality of antennas,
   wherein correspondence relationships between the streams and the weights are derived from feedback information which is transmitted from a reception apparatus for a previous transmission.

2. The transmission apparatus according to claim 1, wherein the multiplier derives the correspondence relationships such that, in an even-numbered transmission, weights used in an odd-numbered transmission are used as weights for different streams in the even-numbered transmission from streams used in the odd-numbered transmission.

3. The transmission apparatus according to claim 1, wherein, in an even-numbered transmission, the transmitter retransmits the same data as data of an odd-numbered transmission.

4. A transmission method performed by a transmission apparatus comprising:
   multiplying a plurality of streams by a plurality of weights; and
   transmitting the plurality of streams multiplied with the weights using a plurality of antennas,
   wherein correspondence relationships between the streams and the weights are derived from feedback information which is transmitted from a reception apparatus for a previous transmission.

5. The transmission apparatus according to claim 1, wherein a first weight multiplied on a first stream in an even-numbered transmission is the same as a second weight multiplied on a second stream in an odd-numbered transmission.

6. The transmission apparatus according to claim 1, wherein the plurality of weights used in an even-numbered transmission are selected from among the plurality of weights used in an odd-numbered transmission.

7. The transmission apparatus according to claim 1, wherein the feedback information includes propagation path information transmitted from the reception apparatus.

* * * * *

UNITED STATES PATENT AND TRADEMARK OFFICE
CERTIFICATE OF CORRECTION

PATENT NO. : 8,208,488 B2  Page 1 of 1
APPLICATION NO. : 12/490231
DATED : June 26, 2012
INVENTOR(S) : Kenichi Miyoshi It is certified that error appears in the above-identified patent and that said Letters Patent is hereby corrected as shown below:

Page 2, Col. 2, line 12, under Other Publications Item (56):
"3GPP TR 25.876 V1.1.0 (Apr. 2002) "3$^{rd}$ Generation Partnership Project; Technical Specification Group Radio Access Network; Multiple-Input Multiple Output Antenna Processing for HSDPA," pp. 3-10." should read, --3GPP TR 25.876 V1.1.0 (2002-02) "3$^{rd}$ Generation Partnership Project; Technical Specification Group Radio Access Network; Multiple-Input Multiple Output Antenna Processing, for HSDPA," pp. 3-10.--.

Page 2, Col. 2, line 17, under Other Publications Item (56):
"K. Miyashita, et al.; "Eigenbeam-Space Division Multiplexing (E-SDM) in a MIMO Channel," IEICE RCS2002-53 (May 2002), pp. 13-18." should read, --K. Miyashita, et al.; "Eigenbeam-Space Division Multiplexing (E-SDM) in a MIMO Channel," IEICE, RCS2002-53 (May 2002), pp.13-18.--.

Signed and Sealed this
Twenty-first Day of August, 2012

David J. Kappos
*Director of the United States Patent and Trademark Office*